United States Patent [19]

Ueda

[11] 4,103,845

[45] Aug. 1, 1978

[54] TAKE-UP FORCE ELIMINATOR FOR SAFETY BELT RETRACTOR

[75] Inventor: Takeo Ueda, Fujisawa, Japan

[73] Assignee: NSK-Warner K.K., Tokyo, Japan

[21] Appl. No.: 816,492

[22] Filed: Jul. 18, 1977

[30] Foreign Application Priority Data

Aug. 18, 1976 [JP] Japan ............................ 51-109649[U]

[51] Int. Cl.² ........................ A62B 35/02; B65H 75/48
[52] U.S. Cl. ................................................ 242/107.7
[58] Field of Search ... 242/107.7, 107.6, 107.4 R–107.4 E,
242/107.12; 297/388; 280/744–747

[56] References Cited

U.S. PATENT DOCUMENTS

| | | | |
|---|---|---|---|
| 4,053,116 | 10/1977 | Takada | 242/107.7 |
| 4,057,199 | 11/1977 | Scibbe et al. | 242/107.7 |

*Primary Examiner*—Harvey C. Hornsby
*Assistant Examiner*—John M. Jillions
*Attorney, Agent, or Firm*—Shapiro and Shapiro

[57] ABSTRACT

In a safety belt retractor using a spring force to take up webbing, a take-up force eliminator comprises a ratchet wheel rotatable with a webbing take-up spindle after a delay corresponding to a predetermined angle, rotating means adapted to follow the rotation of the take-up spindle to assume a first and a second position, cam means adapted to stepwisely advance with the displacement of the rotating means from the first position to the second position and to assume a first and a second operative position in accordance with the stepwisely advanced positions, and locking means adapted to follow the cam means to engage the ratchet wheel when the cam means is in the first operative position, thereby locking the take-up spindle against rotation in the take-up direction, and to be disengaged from the ratchet wheel when the cam means is in the second operative position.

7 Claims, 8 Drawing Figures

4,103,845

TAKE-UP FORCE ELIMINATOR FOR SAFETY BELT RETRACTOR

BACKGROUND OF THE INVENTION

1. Field of the Invention

This invention relates to a take-up force eliminator for a safety belt retractor. More particularly, the invention relates to such a take-up force eliminator for eliminating the take-up force exerted on the webbing when a vehicle occupant wears the safety belt, thereby freeing the vehicle occupant from any unpleasant sensation or any oppressive sensation which would otherwise be imparted from the belt.

2. Description of the Prior Art

Take-up force eliminators of the described type have already been proposed, but they are complex to operate.

SUMMARY OF THE INVENTION

It is therefore an object of the present invention to provide a take-up force eliminator for a safety belt retractor which is easy to operate and reliable in operation.

According to the present invention, the take-up force eliminator for a safety belt retractor using a spring force to take-up webbing comprises a ratchet wheel rotatable with a webbing take-up spindle after a delay corresponding to a predetermined angle, rotating means adapted to follow the rotation of the take-up spindle to assume a first and second position, cam means adapted to stepwisely advance with the displacement of the rotating means from the first position to the second position and to assume a first and a second operative position in accordance with the stepwisely advanced positions, and brake means adapted to follow the cam means to engage the ratchet wheel when the cam means is in the first operative position, thereby locking the take-up spindle against rotation in the take-up direction, and to be disengaged from the ratchet wheel when the cam means is in the second operative position.

The invention will become more fully apparent from the following detailed description of some preferred embodiments thereof taken in conjunction with the accompanying drawings.

DESCRIPTION OF THE PREFERRED EMBODIMENT

Figure 1:
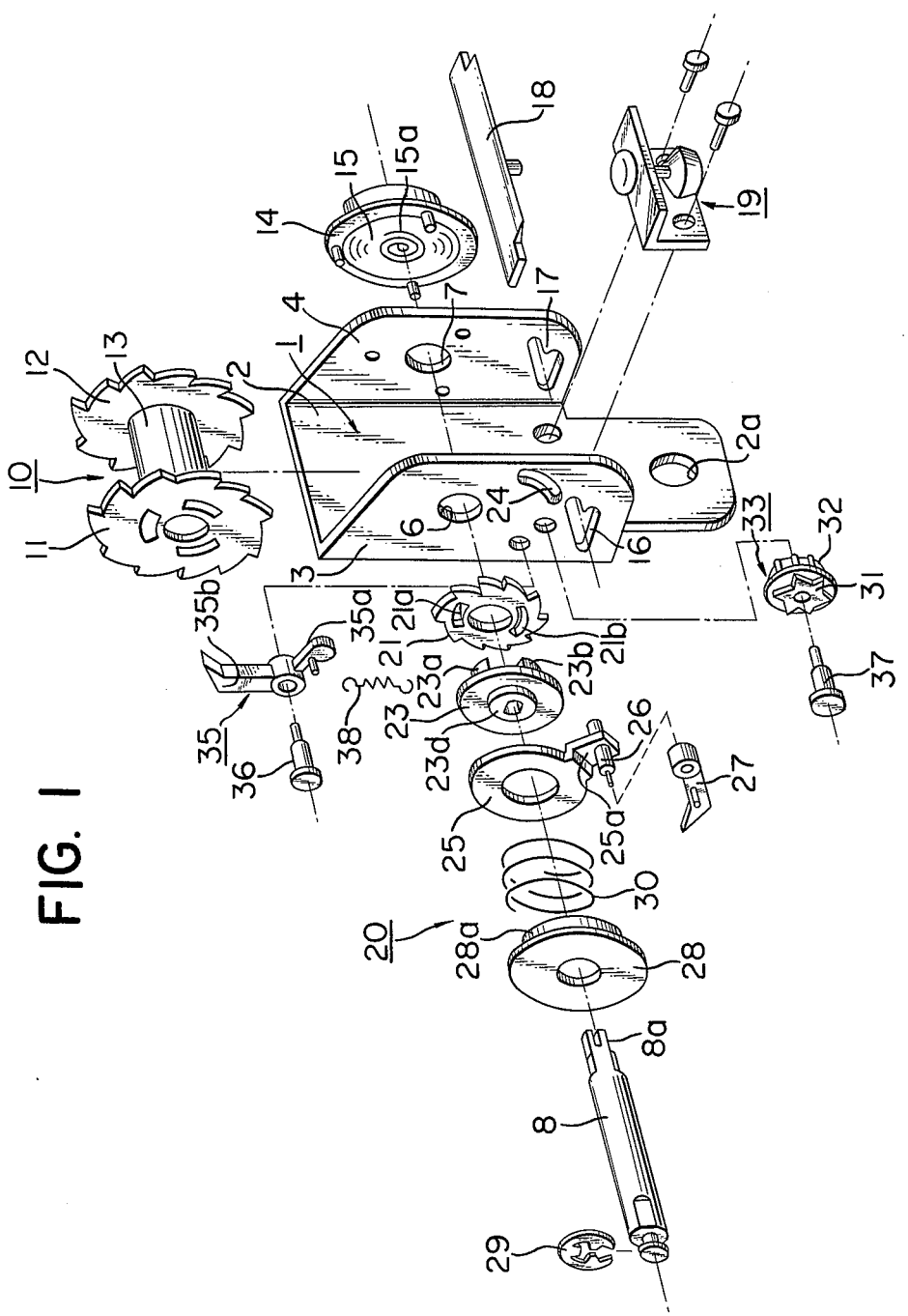
FIG. 1 is an exploded view of a safety belt take-up device which incorporates a first embodiment of the present invention.
Figure 2:
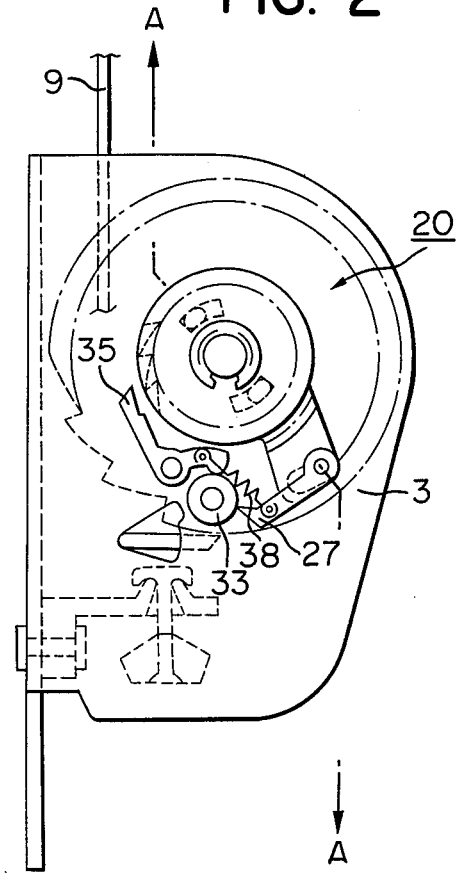
FIG. 2 is a schematic side view of the same device.
Figure 3:
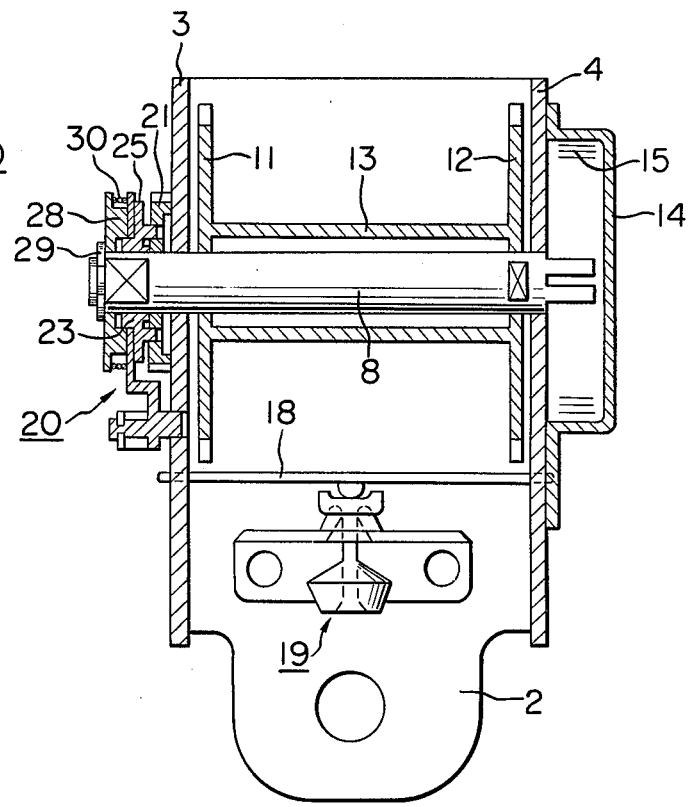
FIG. 3 is an axial cross-sectional view of the same device.

In the drawings, reference character 1 designates the base of a safety belt retractor. The base 1 has a flat base plate 2 and a pair of opposed side plates 3, 4, and the base plate 2 is formed with a hole 2a for securing the base to a vehicle body. Substantially centrally of the base side plates 3 and 4, holes 6 and 7 are formed in opposed relationship with each other and a take-up spindle 8 is rotatably mounted through these holes. A reel 10 is secured on the take-up spindle 8 and between the side plates 3 and 4. More particularly, the reel 10 comprises a pair of ratchet wheels 11, 12 spaced apart from each other by a distance somewhat greater than the width of webbing 9 (FIG. 2), and a cylindrical member 13 extending between and secured to the ratchet wheels. One or both of the ratchet wheels 11 and 12 are secured to the take-up spindle 8 by unshown pin or like means. The inner end of the webbing, not shown, is unremovably attached to the cylindrical member 13. A spring cover 14 is secured to the outer surface of the base side plate 4, and a spiral spring 15 mounted within the cover 14 has its inner end 15a hooked to a cut-away 8a to one end of the take-up spindle 8 so as to bias the take-up spindle in a direction to take up the webbing.

The side plates 3 and 4 are also formed with sector holes 16 and 17, respectively, for mounting therein a locking member 18. The locking member 18 may be actuated by vehicle acceleration detecting means 19 provided on the root of the base plate 2, so that when the vehicle acceleration detecting means detects a variation in vehicle speed higher than a predetermined value, the locking member may engage the ratchet wheels 11 and 12 to prevent the webbing from being protracted, but this mechanism does not directly pertain to the present invention and need not be described in detail.

The other end of the take-up spindle 8 is projected outwardly of the base side plate 3 so as to mount thereon a take-up force eliminator 20 of the present invention. This take-up force eliminator will hereinafter be described in detail.

A ratchet wheel 21 is rotatably and loosely mounted on the take-up spindle 8 at the end portion thereof which is nearest the base side plate 3. The direction of the teeth on the ratchet wheel 21 is such that when it is engaged by a pawl member 35, to be described, the take-up spindle 8 is locked against rotation in the webbing take-up direction. The ratchet wheel 21 is formed with circumferentially extending grooves 21a and 21b. A disc 23 is disposed adjacent to the ratchet wheel 21 and rotatable with the take-up spindle 8, but slidable with respect to the take-up spindle 8. Two axially extending projections 23a and 23b are projected from that end face of the disc which faces the ratchet wheel 21, and these projections are engaged in the circumferentially extending grooves 21a and 21b, respectively, of the ratchet wheel 21 with some clearance. The angle at which this clearance subtends the axis of the spindle is $\alpha_1$ (see FIG. 5). The disc 23 has a cylindrical projection 23c in the center portion of that side thereof which faces the ratchet wheel 21, and a cylindrical portion 23d in the center portion of the opposite side thereof. A friction ring 25 is rotatably fitted on the cylindrical portion 23d. The friction ring 25 has a radially extending projection 25a, through which a pin 26 extends in the axial direction of the spindle, and a feed pawl 27 is rotatably mounted on the pin 26. The pin 26 extends toward the base side plate 3 and into a circumferentially extending groove 24 formed in the side plate 3 in corresponding relationship with the pin 26. Thus, the angular rotation of the friction ring 25 may be limited to an angular range $\alpha_2$ restricted by the circumferentially extending groove 24 (see FIG. 5). This angle $\alpha_2$ is in a relation with the aforesaid angle $\alpha_1$ that $\alpha_2 \leq \alpha_1$.

Figure 4:
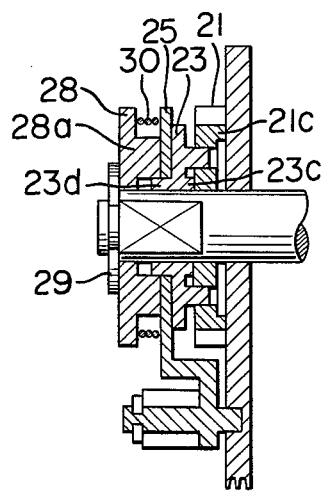
FIG. 4 is an axial cross-sectional view of the essential portions of the same device.

A support disc 28 is fitted on the rotatable spindle 8 at the axially outer side of the friction ring 25. The support disc 28 has a cylindrical portion 28a having an end face projected axially inwardly, namely, toward the friction ring 25, and the inner peripheral surface of this cylindrical portion 28a has a diameter sufficient for the cylindrical portion to loosely fit over the projected cylindrical portion 23d of the disc 23. A compression coil spring 30 is mounted around the cylindrical portion 28a, and the disc 28 is secured to the end of the take-up spindle 8 by means of a set member 29, so that by the bias force of the compression coil spring 30, the friction ring 25 is brought into friction engagement with the corresponding end face of the disc 23 secured to the take-up spindle 8 and the projected end face 21c of the ratchet wheel 21 is brought into friction engagement with the base side plate 3. On the other hand, the cylindrical projection 23c (FIG. 4) of the disc 23 is in friction engagement with the corresponding end face of the ratchet wheel 21.

With the above-described construction, the ratchet wheel 21 can follow the rotation of the take-up spindle 8 to rotate with a delay corresponding to the angle $\alpha_1$, and during the rotation of the take-up spindle 8, the friction ring 25 can rotate, due to its friction engagement with the disc 23, within the angular range $\alpha_2$ limited by the circumferentially extending groove 24.

In the vicinity of the location whereat the feed pawl 27 is mounted, a stepwise advance member 33 having a ratchet pinion 31 and a peripheral cam 32 integrally formed with each other on the opposite sides thereof is rotatably mounted on the base side plate 3 by means of a pin 37, and the tip end of the feed pawl 27 engages one of the teeth on the ratchet pinion 31. Thus, if the friction ring 25 is rotated in the webbing drawing direction over the angular range limited by the circumferentially extending groove 24, the stepwise advance member 33 will be rotated by the feed pawl 27 for an amount corresponding to one pitch of the ratchet pinion 31. The peripheral cam 32 has a shallow peripheral grooved portion 32a and a deep peripheral grooved portion 32b alternately formed so as to correspond to the pitches of the pinion 31. The proportion between the shallow peripheral grooved portion 32a and the deep peripheral grooved portion 32b could be such that the shallow peripheral grooved portion 32a corresponds to one pitch of the ratchet pinion 31 while the deep peripheral groove portion 32b corresponds to plural times of the one pitch. Alternatively, the shallow peripheral grooved portion 32a may correspond to plural times of the deep peripheral grooved portion 32a.

A locking member 35 is rotatably supported, by a pin 36, on the base side plate 3 adjacent to the stepwise advance member 33. The locking member 35 has a portion 35a engageable with the peripheral cam 32 of the stepwise advance member 33 and a locking portion 35b capable of meshing with the ratchet wheel 21. A tension spring 38 is provided between the locking member 35 and the feed pawl 27 so as to bias these to ensure the feed pawl 27 to be always in engagement with the ratchet pinion 31 and to ensure the portion 35a of the locking member 35 to be always in engagement with the peripheral cam 32. The locking member 35 is such that when the portion 35a thereof engages the shallow peripheral grooved portion 32a of the peripheral cam 32, the locking member is rotated counter-clockwise to bring its locking portion 35b out of engagement with the ratchet wheel 21 and that when the portion 35a is engaged with the deep peripheral grooved portion 32b of the peripheral cam 32, the locking member is rotated clockwise to bring its locking portion 35b into engagement with the ratchet wheel 21 to stop this ratchet wheel from rotating in the take-up direction. The initial positions of the peripheral cam 32 and the brake member 35 are set such that when the webbing is in its fully taken-up or retracted position, the portion 35a of the locking member 35 engages the shallow peripheral grooved portion 32a and the locking portion 35b is out of engagement with the ratchet wheel 21.

Operation will now be described.

Figure 5:
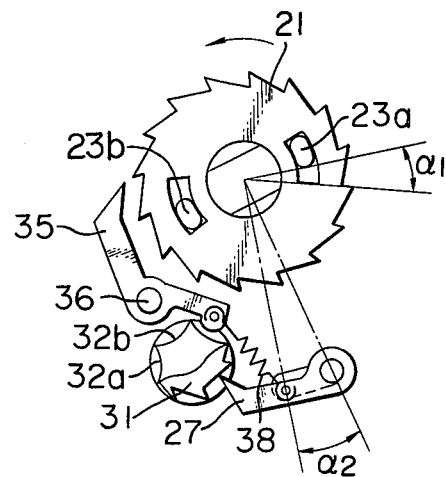
FIGS. 5 to 8 illustrate the sequence of operation.

In the webbing taken-up or retracted position, since the take-up spindle 8 has so far been rotated counter-clockwise by the bias force of the spiral spring 15 and the disc 23 integral with the take-up spindle 8 has also been rotated counter-clockwise, the projections 23a and 23b of the disc 23 are in engagement with the counter-clockwise ends of the circumferentially extending grooves 21a and 21b, respectively, of the ratchet wheel 21 (see FIG. 5). By this time, the friction ring 25 has been rotated counter-clockwise due to its friction engagement with the disc 23 by the coil spring 30, so that the pin 26 is in its return position wherein it is engaged with the counter-clockwise end of the slot 24. On the other hand, the portion 35a of the locking member 35 for engaging the peripheral cam 32 is then in engagement with the shallow peripheral grooved portion 32a, so that the locking member is in a position wherein it has been counter-clockwisely rotated about the pin 36 and the locking portion 35b thereof is out of engagement with the ratchet wheel 21.

Figure 6:
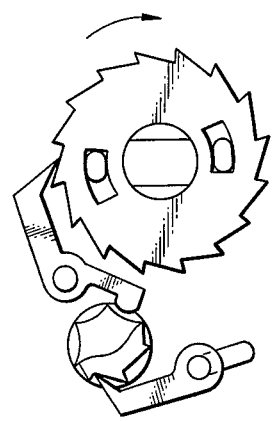

When the webbing is drawn or protracted from this position, namely, from the webbing wound position (see FIG. 6), the take-up spindle 8 is rotated clockwise against the bias of the spring 15 and thus, the disc 23 is also rotated therewith. The ratchet wheel 21 starts rotating with the disc 23 when the projections 23a and 23b of the disc 23 engage the clockwise ends of the circumferentially extending grooves 21a and 21b, after a time delay corresponding to the angle $\alpha_1$ of the circumferentially extending grooves 21a and 21b. When this occurs, the friction ring 25 follows the rotation of the disc 23 so that the pin 26 rotates clockwise until it is stopped by the clockwise end of the slot 24 in the base side plate 3. Thus, the feed pawl 27 feeds the ratchet pinion 31 by an amount corresponding to one pitch. Accordingly, the peripheral cam integral with the ratchet pinion is also rotated, so that the locking member 35 is rotated clockwise about the pin 36 by the action of the spring 38 with the portion 35a of the locking member engaged with the deep peripheral grooved portion 32b. In this manner, the locking portion 35b is brought into a position of engagement with the ratchet wheel 21. Even if the locking portion 35b is in such position of engagement, clockwise rotation of the ratchet wheel 21 may still occur to continue drawing out or protracting the webbing by a desired amount.

Figure 7:
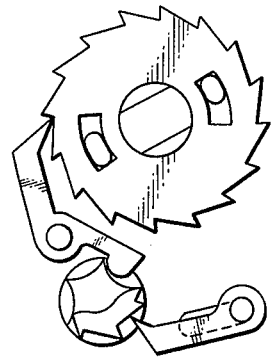

When the draw-out of the webbing is stopped with a result that the webbing is somewhat slackened, the take-up spindle 8 is rotated in the take-up or rewinding direction (counter-clockwise direction) by the bias force of the spiral spring 15. Therefore, the ratchet wheel 21 is rotated counter-clockwise by the drive from the disc 23 until it is locked by the locking member 35 in the manner as shown in FIG. 7. This is the safety belt wearing position in which the spring force of the spiral spring 15 is blocked so that the vehicle occupant wearing the webbing does not undergo any pressure force or any oppressive sensation from the webbing (FIG. 7). By this time, the friction ring 25 has followed the disc 23 to rotate counter-clockwise to its limit position and the feed pawl 27 has returned to its initial position.

When the webbing is protracted again, the take-up spindle 8 is rotated clockwise by the webbing (see FIG.

Figure 8:
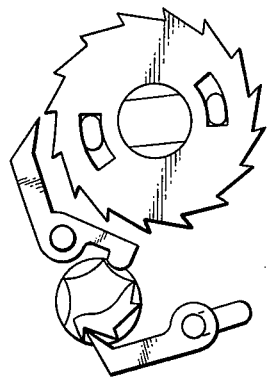

8). Thus, the feed pawl 27 again engages the ratchet pinion 31 to feed it by an amount corresponding to one pitch and the portion 35a of the locking member 35 engages the shallow peripheral grooved portion 32a of the peripheral cam 32, so that the locking member 35 is moved out of engagement with the ratchet wheel 21 to permit the webbing to be taken up. FIG. 8 shows this position.

Where the proportion between the shallow peripheral grooved portion 32a and the deep peripheral grooved portion 32b of the peripheral cam 32 is one pitch to plural pitches of the ratchet pinion 31, the locking action on the ratchet wheel 21 will be more reliable but, when taking up the webbing, it will be necessary to pull or loosen the webbing as often as the number of the plural pitches. Conversely, where the proportion is plural pitches to one pitch, the wearer of the safety belt will have to effect locking by pulling or loosening the webbing as often as the number of the plural pitches and by doing so, the wearer can more consciously adjust the position of locking.

Also, even when locking is effected with the webbing having been fully drawn out, the take-up spindle 8 rewinds the webbing by an amount corresponding to the clearance (angle $\alpha_1$) provided by the length of the circumferentially extending grooves 21a, 21b of the ratchet wheel 21, so that the friction ring 25 follows it to return to its initial position. Thus, the lock can be readily released.

According to the present invention, the webbing take-up force is eliminated in the safety belt wearing position and thus, the wearer need not effect any extra operation and does not undergo any oppressive or unpleasant sensation which would otherwise result from the take-up force.

Where it is desired to adjust the length of the webbing or to dismount the webbing, the vehicle occupant is only required to impart a slight pull to the webbing.

What I claim is:

1. A take-up force eliminator for a safety belt retractor using a spring force to take up webbing, comprising:
    a ratchet wheel rotatable with a webbing take-up spindle after a delay corresponding to a predetermined angle;
    rotating means adapted to follow the rotation of said take-up spindle to assume a first and a second position;
    cam means adapted to stepwisely advance with the displacement of said rotating means from said first position to said second position and to assume a first and a second operative position in accordance with the stepwisely advanced positions; and
    locking means adapted to follow said cam means to engage said ratchet wheel when said cam means is in said first operative position, thereby locking said take-up spindle against rotation in the take-up direction, and to be disengaged from said ratchet wheel when said cam means is in said second operative position.

2. A take-up force eliminator according to claim 1, wherein said ratchet wheel is formed with circumferentially extending grooves in which projections formed on said take-up spindle are engaged with a predetermined clearance.

3. A take-up force eliminator according to claim 1, wherein said rotating means follows said take-up spindle with the aid of friction force.

4. A take-up force eliminator according to claim 1, wherein the base of said safety belt retractor is provided with a member for limiting the rotation of said rotating means.

5. A take-up force eliminator according to claim 3, wherein said rotating means comprises a friction ring provided on said take-up spindle and a pawl member rotatably mounted on said friction ring, said pawl member being in engagement with a ratchet pinion integrally formed with said cam means.

6. A take-up force eliminator according to claim 1, wherein said cam means includes alternately a deep grooved portion corresponding to said first operative position and a shallow grooved portion corresponding to said second operative position.

7. A take-up force eliminator according to claim 6, wherein said locking means has a portion engageable with said cam means to follow the same and a portion for locking said ratchet wheel, said locking means being rotatably mounted on the base of said safety belt take-up device.

* * * * *